Patented Sept. 20, 1927.

1,643,205

UNITED STATES PATENT OFFICE.

HAROLD WALTER ELLEY AND DONALD HOWARD POWERS, OF WILMINGTON, DELAWARE, ASSIGNORS TO E. I. DU PONT DE NEMOURS & COMPANY, OF WILMINGTON, DELAWARE, A CORPORATION OF DELAWARE.

PRODUCTION OF VULCANIZED RUBBER AND ACCELERATORS THEREFOR.

No Drawing. Application filed March 5, 1925. Serial No. 13,359.

This invention relates to the vulcanization of rubber and like substances and to new accelerators, and comprises a process of vulcanizing rubber involving the use of said new accelerators, and, as a new product, the vulcanized rubber obtained by such process.

One object of our invention is to provide a rubber compound which is superior to ordinary vulcanized rubber in tensile strength, durability, and age-resisting qualities. A second object is to increase the rapidity of the vulcanizing process. Other objects of the invention will become apparent from the following description:

We have discovered that when a nitroso-aryl-disubstituted amine (for example, a para-nitroso-dialkylaniline), dissolved in a suitable solvent such as ethyl alcohol, is treated with a primary, secondary, or tertiary amine of the aliphatic or heterocyclic series, a condensation or addition product is produced which possesses in a remarkable degree the power to accelerate rubber vulcanization, and when so used imparts to the resulting vulcanized rubber a tensile strength, durability and age-resisting qualities superior to those possessed by ordinary rubber.

The para-nitroso-dialkylanilines combine with any amine or heterocyclic base to form so-called addition products or double compounds. The amines for this purpose may include ammonia, as well as the primary, secondary, and tertiary amines. When double compounds are to be formed, we preferably bring together approximately two molecular proportions of the nitroso compound for each molecular proportion of the amine; but, when true condensation products, as distinguished from double compounds, are to be produced, one molecular proportion of the nitroso compound is preferably mixed with about two molecular proportions of the amine or heterocyclic base, the tertiary amines and heterocyclic bases which do not have a replaceable hydrogen atom attached to nitrogen not being available, of course, for the manufacture of these condensation products.

The preparation of double compounds of the kind above described may be illustrated by the following examples:

I. Five hundred pounds of para-nitroso-dimethylaniline are dissolved in alcohol and two hundred and fifty pounds of n-butyl-amine are slowly added, keeping the temperature of the mixture below 80° C. At the end of two hours the alcohol is removed under diminished pressure and the product dried at room temperature and atmospheric pressure to remove small amouts of moisture.

II. Six hundred and sixty-two pounds of nitroso-dimethylaniline are dissolved in alcohol and one hundred and seventy-five pounds of pyridine are slowly added at room temperature. At the end of an hour the alcohol is removed under diminished pressure and the resulting product dried at ordinary temperature.

III. The double compound between para-nitroso-dimethylaniline and piperidine may be obtained in the manner described in Example II, except that one hundred and ninety pounds of piperidine are mixed with six hundred and sixty-two pounds of the nitroso-dimethylaniline.

The production of a condensation product between a nitroso compound and a base containing a nitrogen atom with a replaceable hydrogen, may be illustrated by the following examples:

IV. Four hundred and fifty pounds of para-nitroso-dimethylaniline are added to three hundred and twenty-five pounds of benzylamine which has been previously heated to 120° C. The mixture is agitated and maintained at 115°–120° for an hour or until all the water is driven off. The product is then cooled and broken up.

V. Three hundred pounds of para-nitroso-dimethylaniline are slowly added to six hundred and eighty pounds of diphenyl-amine which is heated to 120°–125°. The water is driven off by maintaining the mixture at this temperature for 0.75 hours. The product is then cooled and is ready for use.

VI. One hundred and fifty pounds of para-nitroso-dimethylaniline is added to one hundred and seventy pounds of piperidine, heated to 100° C. under a reflux condenser. The mixture is refluxed for two hours and the water then removed under diminished pressure.

The condensation reaction probably proceeds in accordance with the following equation:

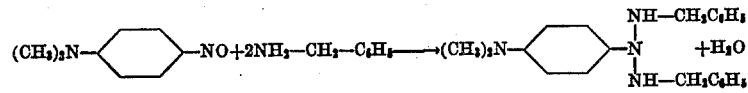

The efficacy of our new accelerators may be illustrated by the following examples:

A rubber mixture was prepared having the following composition:

| | Parts. |
|---|---|
| Smoked sheet rubber | 50 |
| Amber crepe | 50 |
| Zinc oxide | 6.05 |
| Sulfur | 4.34 |
| Accelerator | .75 |

When this mixture was heated for 60 minutes at a temperature corresponding to 40 pounds steam pressure and using the double compound of para-nitroso-dimethylaniline and butyl-amine as the accelerator, the vulcanized rubber had a tensile strength of three thousand five hundred and seventy (3570) pounds, and when using as an accelerator the double compound of para-nitroso-dimethylaniline and piperidine (under the same conditions) the product had a tensile strength of three thousand seven hundred and eighty (3780) pounds. Using the double compound of para-nitroso-dimethylaniline and pyridine, and curing for thirty minutes at forty pounds steam pressure, the product was found to have a tensile strength of two thousand eight hundred and nineteen (2819) pounds.

As stated above, we may use any of the amines and heterocyclic bases in the production of the new double compounds, and practically any amine or heterocyclic base whose nitrogen atom contains a replaceable hydrogen in the production of our new condensation products, all of these compounds and products being referred to generically as para-nitroso-dialkylaniline-base combinations. In place of the nitroso-dimethylaniline mentioned specifically in the above examples, we may use the homologues thereof such as para-nitroso-diethylaniline, para-nitroso-(normal) dibutyl-aniline, para-nitroso-dimethyltoluidine, etc.

When, in the formula for a rubber mix given above, the accelerator used is the condensation product of para nitroso dimethylaniline and benzylamine, and the mixture is heated for 30 minutes at a temperature corresponding to 40 pounds steam pressure, the resulting vulcanized rubber was found to have a tensile strength of 2740 pounds.

We claim:

1. The process of treating rubber which comprises combining with the rubber a vulcanizing agent and a compound resulting from the combination of a nitroso-dialkyl-aryl-amine with an aliphatic amine, and vulcanizing the rubber mix.

2. The process of treating rubber which comprises combining with the rubber a vulcanizing agent and a double compound of a nitroso-dialykl-aryl-amine and an aliphatic amine, and vulcanizing the rubber mix.

3. The process of treating rubber which comprises combining with the rubber a vulcanizing agent and a double compound of a nitroso-dialkylaniline and an aliphatic or heterocyclic amine, and vulcanizing the rubber mix.

4. The process of treating rubber which comprises combining with the rubber a vulcanizing agent, combined zinc, and a double compound of para-nitroso-dimethylaniline and an aliphatic amine or heterocyclic base, and vulcanizing the rubber mix.

5. The process of treating rubber which comprises combining with the rubber a vulcanizing agent and the condensation product of one molecular proportion of a nitroso-dialkyl-aryl-amine and two molecular proportions of an amine containing a replaceable hydrogen atom attached directly to a nitrogen atom, and vulcanizing the rubber mix.

6. The process of treating rubber which comprises combining with the rubber a vulcanizing agent and the condensation product of one molecular proportion of a nitroso-dialkyl-aryl-amine and two molecular proportions of a primary or secondary amine, and vulcanizing the rubber mix.

7. A vulcanized rubber-like material derived from rubber or similar material combined with the condensation product of para-nitroso-dialkylaniline and an aliphatic or heterocyclic amine.

8. A vulcanized rubber derived from rubber or similar materials combined with sulfur, combined zinc, and the condensation product of a nitroso-dialkylaniline and an aliphatic or heterocyclic amine whose amino-group contains at least one replaceable hydrogen atom.

9. Vulcanized rubber obtainable by subjecting to a vulcanization temperature a rubber mix containing rubber, sulfur, zinc oxide and an accelerator comprising the condensation product of one molecular proportion of a nitroso-dialykyl-aryl-amine and two molecular proportions of an amine whose amino-group contains at least one replaceable hydrogen atom.

10. Vulcanized rubber obtainable by subjecting to a vulcanization temperature a rubber mix containing rubber, sulfur, zinc oxide and an accelerator comprising the double compound of a nitroso-dialkylaniline and an aliphatic amine or heterocyclic base.

11. A rubber-vulcanization accelerator comprising a compound obtainable by the condensation of a nitroso-dialkyl-aryl-amine with an aliphatic or heterocyclic amine whose amino-group contains at least one replaceable hydrogen atom.

12. A rubber-vulcanization accelerator comprising a compound obtainable by the condensation of a para-nitroso-dialkylaniline with an aliphatic or heterocyclic amine whose amino-group contains at least one replaceable hydrogen atom.

13. A rubber-vulcanization accelerator comprising a compound obtainable by the combination of a para-nitroso-dialkyl-amine with an aliphatic or heterocyclic amine.

14. A rubber-vulcanization accelerator comprising the product of the condensation of one molecular proportion of a nitroso-dialkyl-aryl-amine, with two molecular proportions of an amine whose amino-group contains at least one replaceable hydrogen atom.

15. A rubber-vulcanization accelerator comprising the product of the condensation of one molecular proportion of a para-nitroso-dialkylaniline with two molecular proportions of a saturated organic amine (such as piperidine) whose amino-group contains at least one replaceable hydrogen atom.

16. A rubber-vulcanization accelerator comprising the product of the condensation of one molecular proportion of a para-nitroso-dialkylaniline with two molecular proportions of an alkyl-amine whose amino-group contains at least one replaceable hydrogen atom.

17. The process of vulcanizing rubber which comprises combining with the rubber a vulcanizing agent and the product of the condensation of a nitroso-dialkylaniline with an aliphatic or heterocyclic amine whose amino-group contains at least one replaceable hydrogen atom.

18. The process of vulcanizing rubber which comprises combining with the rubber a vulcanizing agent and a compound resulting from the combination of a para-nitroso-dialkylaniline with a saturated organic amine.

19. The process of vulcanizing rubber which comprises combining with the rubber a vulcanizing agent and a compound resulting from the combination of a para-nitroso-dialkylaniline with a saturated organic amine whose amino-group contains at least one replaceable hydrogen atom.

20. The process of treating rubber, which comprises combining with the rubber a vulcanizing agent and a compound resulting from the combination of a nitroso-dialkyl-aryl-amine with an aliphatic or heterocyclic amine, and vulcanizing the rubber mix.

21. A vulcanized rubber product obtainable by subjecting to a vulcanization temperature a rubber mix, comprising a vulcanizing agent and a compound resulting from the combination of a nitroso-dialkyl-aryl-amine with an aliphatic or heterocyclic amine, and vulcanizing the rubber mix.

22. A vulcanized rubber product, obtainable by subjecting to a vulcanization temperature a rubber mix comprising a compound resulting from a combination of a para-nitroso-dialkyl-amine with an aliphatic or heterocyclic amine.

23. The process of treating rubber, which comprises combining with the rubber a vulcanizing agent and a condensate of a nitroso-dialkyl-aryl-aniline and an aliphatic amine, and vulcanizing the rubber mix.

In testimony whereof we affix our signatures.

HAROLD WALTER ELLEY.
DONALD HOWARD POWERS.